[11] 3,564,261

[72] Inventors Albert F. Hadermann
Ijamsville, Md.;
Stephen C. Ban, Fairfax, Va.
[21] Appl. No. 812,181
[22] Filed Apr. 1, 1969
[45] Patented Feb. 16, 1971
[73] Assignee Melpar, Inc.
Falls Church, Va.

[54] ELECTROLYTIC LIGHT SCATTERING SHUTTER SYSTEM
18 Claims, 6 Drawing Figs.
[52] U.S. Cl.................................................. 250/217,
250/229; 350/161, 350/267, 350/269
[51] Int. Cl........................................................ G02f 1/30
[50] Field of Search........................................... 250/205,
215, 217, 229; 350/150, 151, 160, 161, 266, 267, 269, 168

[56] References Cited
UNITED STATES PATENTS
3,121,169 2/1964 Benton........................... 138/38
3,360,328 12/1967 Pike................................ 350/269

Primary Examiner—Ronald L. Wibert
Assistant Examiner—Edward S. Bauer
Attorney—Hurvitz, Rose & Greene ABSTRACT: An optical shutter in the form of an electrochemical cell responds to an intense light flash to switch from a light transmitting condition to a light scattering condition. The cell includes a pair of electrodes separated by an electrolyte, and normally provides an optical path therethrough. A fast response photoelectric detector is positioned adjacent the cell to sense any intense flash of light falling on the cell, and thereupon to trigger a capacitive discharge through the electrodes and electrolyte of the cell via a high speed switching circuit. The electrolyte decomposes in response to the passage of electric current therethrough to evolve large quantities of gaseous products which form a film of fine bubbles at the electrodes. The bubbles constitute an irregular reflecting surface effective to scatter incident light. Transparency is resumed upon clearing of the bubbles, which may be accomplished by applying supersonic vibrations to the solution, or by elapse of time.

PATENTED FEB 16 1971

INVENTORS
ALBERT F. HADERMANN
& STEPHAN C. BAN

BY Hurvitz, Rose & Greene

ATTORNEYS

INVENTORS
ALBERT F. HADERMANN
& STEPHAN C. BAN

BY Hurwitz, Rose & Greene
ATTORNEYS

ELECTROLYTIC LIGHT SCATTERING SHUTTER SYSTEM

BACKGROUND OF THE INVENTION

The present invention relates generally to optical shutters or light valves, and more particularly to normally light transmissive electrochemical cells in which an electrolyte decomposes in response to an electrical discharge therethrough, to produce a light scattering surface.

A great many types of electrically controlled optical filters have been proposed and implemented. Probably the most significant of these, from a practical point of view, is the type utilizing the Kerr electrooptical effect, in which double refraction or birefringence is exhibited by transparent solids and liquid when placed in a strong electric field. Kerr cells containing nitrobenzene are extensively used, for example, as electrooptical control devices or shutters in motion picture filming. In general, however, Kerr cell light modulators or valves have the disadvantages that high voltages are required, spectral coverage is poor, and optical density undergoes only slight change between full "open" and full "closed" conditions.

Another class of prior art light filters which may be considered electrooptical, is that in which Faraday effect (or Kerr magnetooptical effect) is exhibited i.e., magnetooptical rotation of plane of polarization of incident light to reduce the passage of light through the device. Again, strong fields are required and only relatively small changes in optical density occur.

Active photochromic devices have the disadvantages that they require a secondary power system, that is, secondary to the primary source of the light flash, in order to provide adequate optical density, and even then spectral coverage is poor. Passive photochromic devices such as sunglasses and other optical filter mechanisms generally rely on a color change induced by incident light, but are known to have very slow response to changes in light intensity.

Electrochromic light valves e generally involve an electrically triggered absorption of light, either by shifting the absorption spectrum of a medium subjected to an electric field, or by changing the color of a solution separating a pair of electrodes by an electrical discharge therethrough. The principal disadvantages of such valves are slow response and limited spectral coverage.

Other systems are known which rely on the opaque plating of a normally transparent wall or surface in response to the triggering of an electrical discharge by an intense light flash. Such systems, too, are very slow, and are usually irreversible, although they exhibit excellent properties of attenuation of light.

It is a principal object of the present invention to provide an optical shutter capable of rapid response to brief, intense light flashes to significantly attenuate the light through the shutter and in which attenuation is based on light scattering, enabling wide spectral coverage.

SUMMARY OF THE INVENTION

The present invention resides, in one of its embodiments, in an electrolytic cell having a pair of transparent or semitransparent electrodes and having an electrolyte that decomposes upon passage of an electric current therethrough to generate large quantities of bubbles. As follows from Faraday's law, in electrochemical cells the extent of the decomposition (i.e., magnitude of the chemical effect) depends on the amount of ampere-seconds. Current is generated through the cell by s discharging a high level capacitor through the cell electrodes via a switching circuit triggered to a conductive condition by a photoelectric sensor.

The shutter is primarily intended to protect the eyes of a viewer or to protect highly sensitive electrooptical equipment from the damaging effects of intense light flashes. Accordingly, the invention may be used as an isolated protective device in the form of goggles or windshields, or may be a component part of an electrooptical system. However, it is also suitable for any other conventional applications of light valves requiring rapid transition from a transparent state to a high light attenuating state.

The preferred electrolyte is an aqueous solution of an alkali metal tribasic phosphate, because of its capability of generating vast quantities of bubbles during electrolytic decomposition, but any electrolyte that dissociates to evolve large quantities of gaseous products upon passage of practical amounts of short term current therethrough is suitable. The bubbles so evolved tend to form on one of the electrodes and will cling as a film of fine bubbles to any surface, including smooth, irregular, or interrupted surfaces, so that continuous planar electrodes, or wire grids or screen electrodes may be utilized.

As the bubbles form they cause image destruction, thereby preventing the existence of a sharp retinal image and the possibility of retinal burn (which would depend on the nature, e.g., spectral coverage, and the intensity of the light flash). Almost immediately thereafter, the film of fine bubbles serves to reflectively scatter the incident light because of the irregularity of the surface of the film.

The device is reusable, in that shortly after the electrolytic decomposition, the bubbles will spontaneously coalesce to return the shutter to its transparent state. Preferably, however, the bubbles are more rapidly cleared by ultrasonic agitation of the electrolyte.

In a second embodiment, the invention resides in an electrochemical cell having the shape of a prism, and in which the electrodes are opaque, parallel, planar conductors whose confronting surfaces are highly reflective either as a result of polishing or as a natural consequence of the type of metal of which the electrodes are composed. An optical path normally exists through the prism as a consequence of refraction of light rays through the glass walls forming the remaining two sides of the cell, and through the electrolyte contained therein, and of reflection of light rays from the cell walls constituting the electrodes. As in the previously mentioned embodiment, the optical path is interrupted by passage of sufficient current in a brief time span (ampere-seconds) through the electrolyte via the electrodes to cause dissociation of the electrolyte and evolution of gaseous products therethrough. Thus, except for the nature of the optical path through the cell, and the use of reflective electrodes, the second embodiment is quite similar to the first embodiment.

BRIEF DESCRIPTION OF THE DRAWINGS

The above and still further objects, features and attendant advantages of our invention will become apparent from the following detailed description of a preferred embodiment, especially when considered with the accompanying drawing in which.

DESCRIPTION OF THE PREFERRED EMBODIMENT

Figure 1:
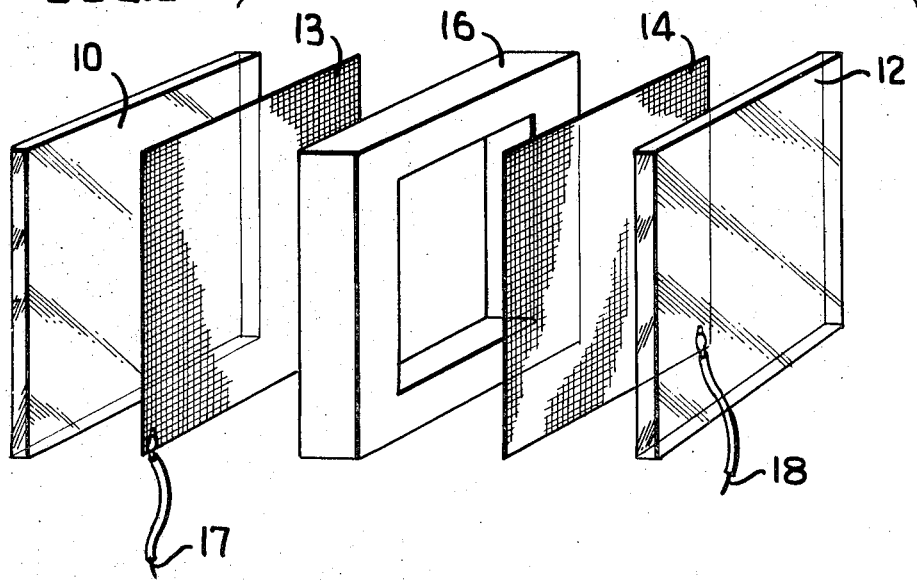
FIG. 1 is an exploded perspective view of a first embodiment of the basic electrochemical cell structure for the shutter.

Referring now to the drawing, the basic electrochemical cell includes a pair of glass plates 10, 12 (FIG. 1) or other transparent medium suitable for retention of the electrolyte in the cell. The glass plates are positioned at either end of the cell and immediately adjacent to each is a respective planar electrode 13, 14 which may be composed of any metal, e.g., platinum or silver, and which is illustrated as having the form of a wire mesh, grid, or screen, although perfectly smooth continuous transparent electrodes are suitable as well.

The mesh preferably has openings that are sufficiently small to encourage the retention of fine bubbles thereon, but a compromise must be made to ensure that the semitransparent character of the electrodes, and hence, of the cell, is maintained to permit viewing or optical sensing prior to electrolytic decomposition. Again, it is to be emphasized that other types and forms of electrodes and electrode materials may alternatively be used. For example, each of the electrodes may be continuous transparent conductive sheet, such as a thin tin oxide film, although extremely thin electrodes are subject to destruction by large current densities through the cell.

Sandwiched between the electrodes is a relatively thick insulative gasket 16 preferably of opaque material. The material must be suitable to retain a liquid electrolyte, and with the aid of a suitable sealant to be applied to all exterior joints of the cell, should seal the cell against leakage of electrolyte or products of decomposition. A preferred insulative material for gasket 16 is polyethylene.

In assembling the cell, the wire mesh electrodes are bonded to respective ones of glass plates 10 and 12 by the use of cement, and a respective wire lead 17, 18 is conductively connected to each electrode screen. The electrode leads 17 and 18 are to extend from the cell during assembly, to permit connection of electrical circuitry to the electrodes. The insulative gasket 16 is then cemented or otherwise bonded to one of the mesh electrodes and to its associated glass plate without interfering with the transparency of the cell in the central open area of the gasket. Sealant is applied to the joints of the unit as it has thus progressed.

Next, the open region of the insulative gasket is filled with a light transmitting electrolyte solution 19. Preferably, the electrolyte is an aqueous solution of an alkali metal tribasic phosphate, such as tribasic potassium phosphate or trisodium phosphate. The solution may be saturated although in several instances an unsaturated solution has been used with great effectiveness. It should be emphasized, however, that any electrolyte capable of dissociation to produce a relatively large mass of gaseous ions may be used.

The remaining glass plate and associated fastened electrode are bonded to the insulative gasket along the free side of the gasket, and the remaining edges sealed. The quantity of electrolyte in the cell should be sufficient to prevent any significant pocket of air or other gas to remain in the cell, or at least a body of gas of such size that a light path could exist other than through the electrolyte when the shutter is oriented for use in blocking or attenuating light.

If desired, the entire cell, as thus far described, may be retained in an open-sided opaque case 20 (FIG. 2) in the form of a band about the edges of the cell and partly overlying the sides of the cell near its periphery and the unit then hermetically sealed. If the sides of the case extend into the open area on window normally defined by the open portion of gasket 16, then any slight space not occupied by electrolyte as a consequence of air in the cell is covered by opaque material.

Figure 2:
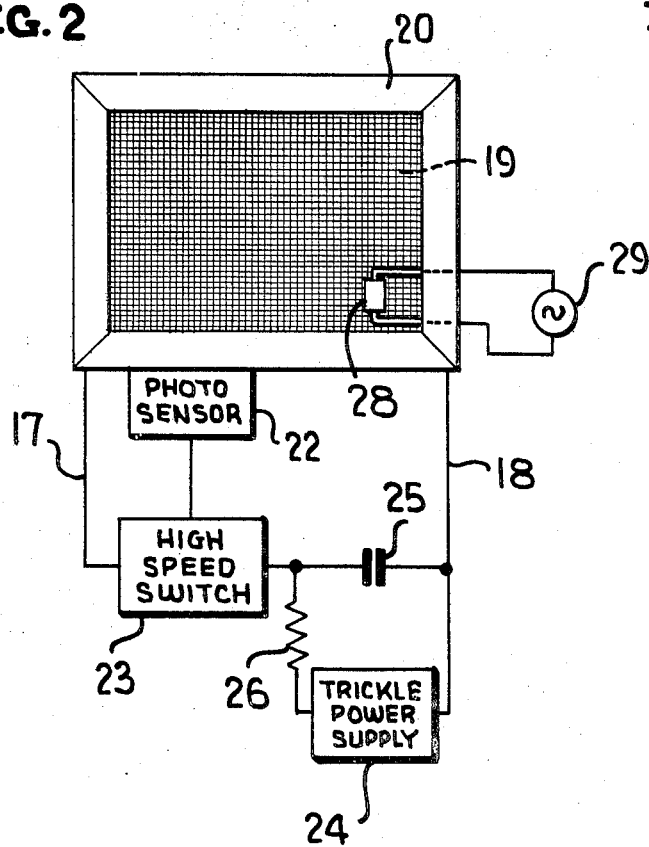
FIG. 2 is a front view of the cell, showing connection of the basic electrical circuitry in block diagrammatic form.
Figure 3:
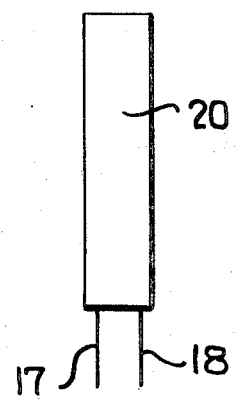
FIG. 3 is a side view of the cell.

Leads 17 and 18 are electrically connected exteriorly of the cell to a trigger circuit for supplying a high-voltage impulse to the electrodes in response to detection of an intense light flash. Circuits of this type are well known and therefore, the block diagram of the circuit as shown in FIG. 2 is intended only to be illustrative of the basic components of a suitable trigger circuit. Details of such a circuit may be had by reference, for example, to U.S. Pat.No. 3,360,328.

Referring to FIG. 2 of the present application, sensor 22 is a photoelectric device, such as a photovoltaic cell, preferably mounted on case 20 for exposure to the same source of light as is the shutter. In response to incidence of light on sensor 22 it generates an output voltage which is supplied via appropriate leads to a high speed switching circuit 23. If the overall circuit is intended to respond to light above normal ambient level, and specifically to intense light flashes of the kinds that accompany nuclear explosions, plasma discharges, laser emissions, and so forth, the high speed switching circuit may be implemented or adjusted to be turned "on" by a voltage level generated by sensor 22 only upon incidence of light of a specific level. For example, a silicon controlled rectifier (not shown) having a gating voltage level corresponding to the desired voltage level may be selected for use in the switching circuit.

A power supply 24 supplies charging current to a high voltage capacitor 25 which is connected in a completed circuit with leads 17 and 18 when switching circuit 23 is switched on. Power supply 24 need only supply sufficient current to maintain a full charge on capacitor 25, once the latter has been charged from a high voltage source. For this purpose, source 24 may have a high resistance 26 connected in series therewith, to supply a trickle current to the capacitor. Thus, for example, capacitor 25 may be adapted to be plugged into a source of rectified, filtered, AC voltage during standby periods or whenever the charge on the capacitor has been substantially depleted.

An element 28 capable of producing ultrasonic vibrations, such as a quartz crystal, is preferably mounted within the electrolytic cell, via suitable insulated terminals extending through insulative gasket 16, and is connected to an oscillator 29 for supplying an energizing voltage to the crystal. The crystal 28 is energized whenever light-scattering bubbles within the electrolyte are to be cleared (by coalescence).

In use of the optical shutter or light valve which has been described, in response to incidence of light of a specified intensity on photosensor 22, and thus on the window (transparent or semitransparent area) of the electrolytic cell, sensor 22 generates a voltage whose level is sufficient to turn on switch 23. Accordingly, capacitor 25 is discharged through the electrolytic cell, to provide a large pulse of current initiating chemical decomposition of the electrolyte to release gaseous products (oxygen and hydrogen). The extent of electrolytic decomposition, and therefore the quantity of gas involved, depends upon the magnitude of current through the electrolyte. The oxygen and hydrogen gases are released in the form of a large quantity of small bubbles within the electrolyte solution, and preferentially move to form one or more layers of bubbles of the respective gas (O—, H+) at the electrode of opposite polarity (anode, cathode, respectively). One or more layers of these bubbles is effective to produce random reflection, i.e., scattering or dispersion, of the light falling on the cell window. In this manner, the cell undergoes rapid transition from a normally transparent or semitransparent condition to a condition of substantial light attenuation, acting as a light valve or shutter which may be utilized to prevent or to significantly reduce the passage of light through the cell to the eye of a human viewer or to a photosensitive component of an optical system.

In practice, we have observed that cells having electrodes composed of substantially any conductive or semiconductive films, sheets, or screens, separated by a distance of from 0.5 mm. to several inches and each having an area of several square inches, with an electrolyte composed of a saturated solution of potassium phosphate (tribasic) in water, at an ambient temperature of 25° C., will go from a clear state to an optical density (opaque quality) of 3.0 at from about 50 microseconds to about 300 microseconds from the initiation of an electrical discharge of several amperes through the electrolyte.

Within a period of a few minutes after cessation of current through the cell, the bubbles will have spontaneously coalesced to return the cell to a clear condition. However, ultrasonic agitation will hasten the coalescence, and is preferred.

Figure 4:
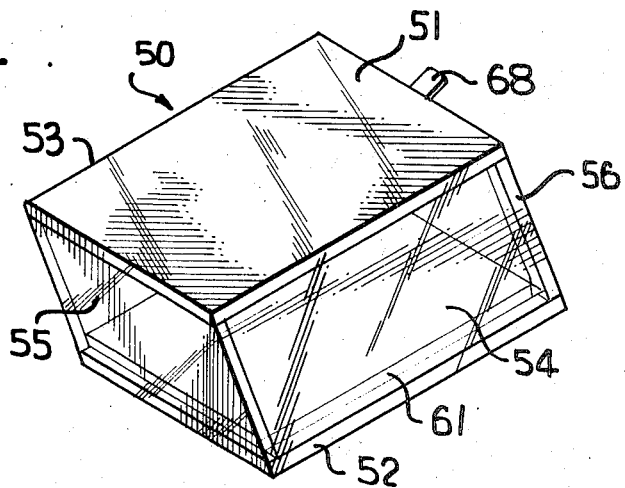
FIG. 4. is a perspective view of a second embodiment of an electrochemical cell for use as an optical shutter, according to our invention.
Figure 5:
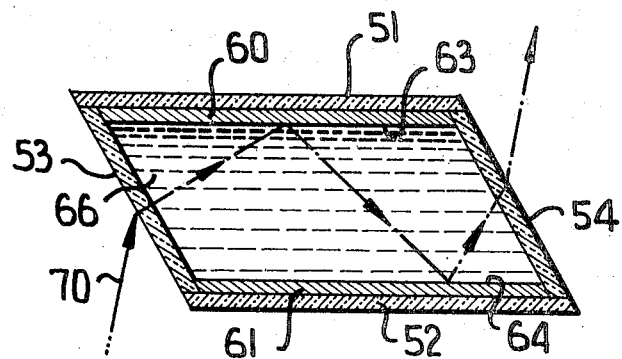
FIGS. 5 and 6 are end section and side views, respectively, of the cell of FIG. 4.
Figure 6:
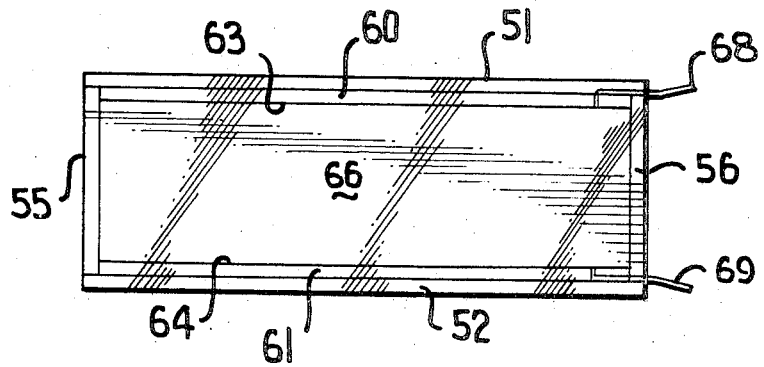

Referring now to FIGS. 4—6, a second embodiment of the invention comprises an electrochemical cell in the form of a prism 50 composed of glass or plastic sidewalls 51, 52, 53, 54 and end walls 55 and 56. Sidewalls 51 and 52 are parallel to one another, as are sidewalls 53 and 54, and end walls 55 and 56. Immediately adjacent the interior surfaces of sidewalls 51 and 52 are opaque slab electrodes 60 and 61, respectively, preferably composed of chromium to provide highly reflecting confronting surfaces 63 and 64. The interior of the prismatic chamber is filled with an electrolyte 66 of the type discussed in conjunction with the first embodiment, prior to sealing the last end wall.

In practice, a hole or slot may be provided in each of sidewalls 51 and 52 to permit connection of respective electrical leads 68, 69 to electrodes 60, 61. These leads are to be connected to appropriate energizing circuitry in the same manner as leads 17, 18 in the first embodiment. Insulating sidewalls 51 and 52 need not be used in cases where exposure of the electrodes is permissible.

It will be observed from the end view of FIG. 5 that right regular sections through cell 50 are in the shape of parallelograms. As viewed in that FIG. a light ray 70 incident on wall 53 is refracted upon entry therein and is further refracted as it enters the boundary between wall 53 and electrolyte 66. The ray is reflected from the highly polished surface 63 of electrode 60 and strikes reflecting surface 64 of electrode 61. Finally, the ray is refracted upon incidence at the boundary between electrolyte 66 and wall 54 and at the boundary between wall 54 and the air.

Thus, an optical viewing path exists through the prismatic electrochemical cell, and that path may be removed passing high current through the cell vie via the electrodes, in the same manner as was described earlier, to decompose the electrolyte with resulting production of the diffusing layer of bubbles. Cells constructed according to the teaching presented herein have been demonstrated to remain operative over several open-closed cycles, the specific number of useful cycles depending largely upon the type of electrolyte and its strength, e.g., the amount of the alkali metal tribasic phosphate in the aqueous solution (saturation being preferred), and upon the amount of current through the cell (and hence, the extent of electrolytic decomposition) during the closure part of each cycle.

We claim:

1. A light valve, comprising an electrolytic cell normally providing a substantially unobstructed path for light therethrough, said cell including a pair of spaced-apart electrodes, at least one of said electrodes lying throughout a plane extending entirely across said light path, and an electrolyte capable of dissociation upon passage of electric current therethrough to generate sufficient bubbles to diffuse light entirely across said path through said electrolyte.

2. The light valve according to claim 1 further including means connected to said electrodes for producing an electric current through said cell of sufficient intensity and brevity to rapidly and at least partially decompose said electrolyte to from said layer of bubbles across said light path.

3. The light valve according to claim 2 wherein said electrolyte is an aqueous solution of an alkali metal tribasic phosphate.

4. The light valve according to claim 3 wherein said electric current producing means includes a capacitor, and means for selectively applying a voltage stored on said capacitor across said electrodes.

5. The light valve according to claim 4 further including photosensitive means responsive to light incident on said electrolytic cell to actuate said means for selectively applying voltage, to discharge said capacitor through said electrolyte.

6. The light valve according to claim 5 wherein said means for selectively applying voltage is constructed and arranged to be actuated by said photosensitive means only in response to a predetermined intensity of light incident on said electrolytic cell.

7. The light valve according to claim 3 wherein the alkali metal of the tribasic phosphate in said aqueous solution is an element selected from the group consisting of potassium and sodium.

8. The light valve according to claim 2 wherein said at least one electrode is a conductive screen.

9. The light valve according to claim 2 wherein said cell has a prismatic right regular cross section and wherein said electrodes are opaque highly reflective sheets for reflecting light along said path.

10. The method of selectively attenuating light through a predetermined optical path, including the steps of:

inserting into said path an electrolytic cell having a normally transparent window therethrough including at least one planar electrode and an electrolyte responsive to a sufficiently large impulse of electrical current to produce gas bubbles in said electrolyte causing scattering of light along said path and through said window; and selectively passing through said cell, including said planar electrode and said electrolyte, a current impulse of sufficient magnitude to produce electrolytic decomposition with the evolution of gas bubbles throughout said electrolyte, to cause said scattering of light incident on said bubbles via said window.

11. The method of claim 10 further including the step of agitating said cell to cause said bubbles to coalesce and thereby permit light to again pass through said window.

12. The method of claim 11 wherein said agitating is performed by ultrasonic vibration of said electrolyte.

13. An electrooptical shutter, comprising:

an electrolytic cell, said cell including:

a pair of spaced-apart electrodes;

a light path through said cell, including said electrodes; and an electrolyte occupying the space between and contacting said electrodes; and means connected to said electrodes and responsive to a flash of light for passing an impulse of electric current through said cell of sufficient magnitude to chemically decompose said electrolyte to produce a layer of bubbles adjacent at least one of said electrodes for reflectively scattering light incident on said cell which would otherwise normally pass substantially unobstructed through said plates, electrodes, and electrolyte.

14. The shutter according to claim 13 wherein said electrolyte is an aqueous solution of alkali metal tribasic phosphate.

15. The shutter according to claim 13 wherein said cell is of prismatic form, and wherein said electrodes are are parallel to one another and have highly reflective confronting surfaces for providing reflection of light along said path after refraction through said cell.

16. The shutter according to claim 13 wherein each of said electrodes comprises a conductive screen.

17. An electrolytic light valve, comprising an electrolytic cell having two spaced electrodes, said spaced electrodes being constructed and arranged to normally provide a light path through said cell;

an electrolyte occupying the space between and contacting said electrodes, said electrolyte being a solution capable of dissociation into a relatively large mass of gaseous ions in response to passage of electric current therethrough; and means including a photosensitive device for transferring a pulse of electric current through said electrolyte via said electrodes of sufficient ampere-seconds to dissociate a sufficient quantity of said electrolyte to cover at least one of said electrodes with gaseous bubbles in response to an increase of light impinging on said photosensitive device.

18. The invention according to claim 16 further including means for at will clearing said layer of bubbles, said last means including means for ultrasonically agitating said electrolyte.

means including a photosensitive device for transferring a pulse of electric current through said electrolyte via said electrodes of sufficient ampere-seconds to dissociate a sufficient quantity of said electrolyte to cover at least one of said electrodes with gaseous bubbles in response to an increase of light impinging on said photosensitive device.

18. The invention according to claim 16 further including means for at will clearing said layer of bubbles, said last means including means for ultrasonically agitating said electrolyte.